United States Patent [19]

Ubersax

[11] 4,177,315

[45] Dec. 4, 1979

[54] COATED POLYMERIC SUBSTRATES

[75] Inventor: Richard W. Ubersax, Parkersburg, W. Va.

[73] Assignee: E. I. Du Pont de Nemours and Company, Wilmington, Del.

[21] Appl. No.: 916,845

[22] Filed: Jun. 16, 1978

Related U.S. Application Data

[62] Division of Ser. No. 774,425, Mar. 4, 1977, abandoned.

[51] Int. Cl.$^2$ .................. C08J 3/02; C08L 83/04; B32B 5/16
[52] U.S. Cl. .................. 428/336; 106/308 Q; 260/29.2 M; 260/37 SB; 428/331; 428/412; 428/446; 428/447; 428/451; 428/480; 428/520; 106/287.14; 106/287.15

[58] Field of Search .................. 106/287 SE, 308 Q; 428/412, 446, 480, 520, 451, 331, 447, 336; 260/37 SB, 29.2 M

[56] References Cited

U.S. PATENT DOCUMENTS

| 3,642,681 | 2/1972 | Hermes | 260/29.2 M |
| 3,894,881 | 7/1975 | Suzuki | 106/287 SB |
| 3,986,997 | 10/1976 | Clark | 260/29.2 M |

FOREIGN PATENT DOCUMENTS

647811 4/1962 Canada .................. 260/29.2 M

*Primary Examiner*—Ellis P. Robinson

[57] ABSTRACT

Abrasion resistant coatings of silica and a partially polymerized organic silanol of the formula RSi(OH)$_3$ having rapid cure times are obtained when the pH of the composition is maintained at greater than 6.0, and preferably 6.2 or greater.

4 Claims, No Drawings

COATED POLYMERIC SUBSTRATES

This a division of application Ser. No. 774,425 filed Mar. 4, 1977, now abandoned.

BACKGROUND OF THE INVENTION

A variety of polymeric materials are used in structural and laminating applications which require optical clarity. For example, methylmethacrylate polymers and polycarbonates are used increasingly in glazing applications and polyethylene terephthalate films can be incorporated into automotive windshields. While these clear plastic substrates perform their structural function for extended periods of time, they are subject to surface scratching which mars their appearance and optical clarity. Accordingly, coatings have been applied in the past to increase the abrasion resistance of these substrates. A need exits for coating compositions which provide better long-term abrasion resistance and permit rapid application and curing consistent with high-speed commercial applications.

SUMMARY OF THE INVENTION

The instant invention provides improved coating compositions for clear polymeric substrates which exhibit excellent abrasion resistance and curing times markedly lower than heretofore realized with earlier compositions.

Specifically, there is provided a rapidly-curing coating composition comprising (a) about from 5 to 50 weight percent solids, the solids comprising about from 10 to 70 weight percent silica and about from 90 to 30 weight percent of a partially polymerized organic silanol of the general formula $RSi(OH)_3$, wherein R is selected from methyl and up to about 40% of a radical selected from the group consisting of vinyl, phenyl, $\gamma$-glycidoxypropyl, and $\gamma$-methacryloxypropyl, and (b) about from 95 to 50 weight percent solvent, the solvent comprising about from 10 to 90 weight percent water and about from 90 to 10 weight percent lower aliphatic alcohol, the coating composition having a pH of greater than about 6.0 and less than about 8.0.

DETAILED DESCRIPTION OF THE INVENTION

The silica used in the instant coating compositions is not critical to the desirable properties of the coatings. The silica can be obtained, for example, by the hydrolysis of tetraethyl orthosilicate to form polysilicic acid. The hydrolysis can be carried out using conventional procedures, for example, by the addition of an aliphatic alcohol and an acid.

Alternatively, the silica used in the instant coating compositions can be colloidal silica. The colloidal silica should generally have a particle size of about from 5–25 millimicrons, and preferably about from 7–15 millimicrons. The alkalinity of the colloidal silica dispersions should generally be less than about 1%, and preferably less than 0.4% for optimum coatings and solution lifetime. Typical colloidal silicas which can be used in the instant invention include those commercially available from E. I. du Pont de Nemours and Company as "Ludox SM", "Ludox HS-30" and "Ludox LS" dispersions.

The organic silanol used in the instant composition has the general formula $RSi(OH)_3$. For optimum performance of the coating compositions, at least about 60% of the R groups, and preferably about from 80% to 100% of these groups, are methyl. Alternatively, up to about 40% of the R groups can be higher alkyl or aryl selected from vinyl, phenyl, $\gamma$-glycidoxypropyl, and $\gamma$-methacryloxypropyl.

The combined solids of the present coating compositions, comprising the silica and the partially polymerized organic silanol, generally make up about from 5 to 50 weight percent of the total coating compositions. Of these solids, the silica should comprise about from 10 to 70 weight percent, and preferably about from 20 to 60 weight percent, the complimentary remainder comprising the organic siloxanol. Weight percents of the organic siloxanol herein are calculated as $RSiO_{1.5}$.

The solvent component of the present coating compositions generally comprises a mixture of water and one or more lower aliphatic alcohols. The water generally comprises about from 10 to 90 weight percent of the solvent, while the lower aliphatic alcohol complimentarily comprises about from 90 to 10 weight percent. The aliphatic alcohols generally are those having from 1 to 4 carbon atoms, such as methanol, ethanol, n-propanol, iso-propanol, n-butanol, sec-butanol and tertiary butanol.

In addition to the basic solvent components of water and alcohol, the solvent portion of the instant compositions can further comprise up to about 10 weight percent of a compatible polar solvent such as acetone, ethylene glycol monoethylether, ethylene glycol monobutylether and diethylene glycol monoethylether.

Still further components which can be present in the instant coating compositions include curing catalysts. These are preferably present in a concentration of about from 0.01% to 0.1% based on the total weight of the composition, and especially about from 0.01 to 0.3 weight percent. Curing catalysts which may be used in the coating compositions can vary widely. Representative catalysts include the alkali metal salts of carboxylic acids such as sodium acetate, potassium acetate, sodium formate, and potassium formate. Other representative curing catalysts which can be used include the quaternary ammonium carboxylates, such as benzyltrimethylammonium acetate.

The instant compositions can be prepared by wide variety of techniques, depending on the particular starting materials used. For example, organotrialkoxysilane can be hydrolyzed in the presence of prehydrolyzed polysilicic acid. Alternatively, organotrialkoxysilane can be prehydrolyzed and then added to a solution of polysilicic acid, often resulting in particularly rapid cure times. Still another alternative in the preparation of these compositions is the cohydrolysis of organotrialkoxysilane and tetraethyl orthosilicate together.

If a colloidal silica is used as the silica source in the instant coating compositions, the organic silanol can be combined with the silica either through the prehydrolysis of the organotrialkoxysilane or by hydrolyzing the organotrialkoxysilane in the presence of acidified colloidal silica dispersion. Still other methods of preparing and combining the components required for the instant compositions will be evident to those skilled in the handling of the individual components.

An important feature of the present compositions is that the pH of the final coating composition be greater than about 6.0 and less than about 8.0. Preferably, the pH is about from 6.2 to 6.5. It has been found that within this range, particularly rapid curing times can be realized. In addition, superior abrasion resistance is often obtained within the pH range of the present invention. The pH of the coating solution can be adjusted according to techniques well known to those skilled in the art, including the addition of an acidic or basic solution. Acids preferred in the instant invention for the adjustment of the pH include hydrochloric and acetic acids, and sodium hydroxide has found to be a particularly satisfactory base for adjustment of pH.

The instant coating compositions can be used for a wide variety of coating applications where a durable, abrasion-resistant surface is desired. The present compositions have beeen found to be particularly satisfactory in the coating of films such as polyethylene terephthalate and sheeting materials such as those prepared from methylmethacrylate polymers and copolymers as well as polycarbonate.

The present coating compositions can be applied using conventional coating techniques, including continuous as well as dip coating procedures. The coatings are generally applied in a thickness of about from 1 to 20 microns, and particularly about from 3 to 10 microns.

Prior to coating the substrate, it may be desirable to pretreat the substrate to promote adhesion of the final coating. Various adhesion promoting techniques known to those skilled in the art can be used, such as flame treating, corona discharge, and resin coating. The priming techniques described in U.S. Pat. No. 3,443,950 have been found particularly convenient.

The present coating compositions, after application to the substrate, can be cured at a temperature of about from 20° to 150° C. The cure times used for the instant coatings are significantly lower than those previously used in the art at comparable temperatures. While ambient temperatures of 20° C. require cure times of several days, elevated temperatures of 150° C. will cure the coatings in several seconds. For convenience in commercial operations, a curing temperature of about 100° C. is preferred, at which cure times of about one minute are realized.

The invention is further illustrated by the following specific examples, in which parts and percentages are by weight unless otherwise indicated.

EXAMPLES 1-3 AND COMPARATIVE EXAMPLE A

A polysilicic acid solution was prepared by hydrolyzing a mixture of 210 g of tetraethylorthosilicate and 90 g of ethyl alcohol with 100 g of 0.02 N hydrochloric acid solution. The product was then allowed to stand at room temperature for 24 hours. To 100 g of the polysilicic acid solution were added 1.0 ml of 10% aqueous acetic acid solution, 50.0 g of water, and 61.0 g of methyltrimethoxysilane (Dow Corning Corp., Z-6070 silane). After the initial exothermic reaction, the solution was allowed to mix at room temperature for an additional 5 hours. The resulting solution was divided into four 50 g portions for Examples 1-3 and Comparative Example A, respectively. To each portion was added a mixture of 20 g of iso-propyl alcohol and 10 g of water. Varying quantities of 0.4N sodium hydroxide solution were then added to achieve the pH specified in Table I. Strips of polyethylene terephthalate film, having a thickness of 7 mils and primed with an adhesion coating of the type described in U.S. Pat. No. 3,443,950, were dip-coated and immediately placed in a 100° C. oven for 60 seconds. The abrasion resistance of the coatings was determined by rubbing the surface in a circular manner with #0000 steel wool at 12.5 psi pressure, using five revolutions at a rate of one revolution per second. The increase in haze as a result of the abrading was measured using a Gardner hazemeter, model #AUX-10. The results of the testing are summarized in the following Table I.

TABLE I

| Example | pH | % ΔH, 100° C./1 min. Cure |
|---------|------|---------------------------|
| A       | 5.55 | 8.0 |
| 1       | 6.04 | 0.6 |
| 2       | 6.39 | 0.4 |
| 3       | 6.81 | 0 |

EXAMPLES 4-6 AND COMPARATIVE EXAMPLES B-G

To 125 g of polysilic acid solution prepared as previously described in Examples 1-3 were added varying amounts of methyltrimethoxysilane as described below:

| Formulation | g Polysilicic Acid | ml 10% Acetic Acid | g Water | g Methyltrimethoxysilane |
|---|---|---|---|---|
| 40% $SiO_2$/ 60% $CH_3Si\ O_{1.5}$ | 125 | 1.0 | 57.6 | 57.6 |
| 33% $SiO_2$/ 67% $CH_3Si\ O_{1.5}$ | 125 | 1.0 | 77.9 | 77.9 |
| 25% $SiO$/ 75% $CH_3Si\ O_{1.5}$ | 125 | 1.0 | 115.2 | 115.2 |

After the initial exothermic reaction, the solutions were stirred for an additional 1.5 hours. Each solution was then divided into three 75 g portions which were then diluted with 25 g of iso-propyl alcohol. To each was then added 0.4N sodium hydroxide solution to bring the pH to the levels specified in Table II. After 4 hours at room temperature, the coatings were applied to primed 7 mil polyethylene terephthalate film by dip coating. Samples were cured at 100° C. for 60 seconds immediately after coating, and abrasion resistance was tested according to the procedures described for Examples 1-3. The results are summarized in Table II.

TABLE II

| | Percent Solids Content | Example | pH | % ΔH |
|---|---|---|---|---|
| 40% $SiO_2$/ 60% $CH_3Si\ O_{1.5}$ | 14.7 | B | 5.5 | 1.2 |
| | | C | 6.0 | 0.1 |
| | | 4 | 6.2 | 0* |
| 33% $SiO_2$/ 67% $CH_3Si\ O_{1.5}$ | 15.2 | D | 5.5 | 12.6 |
| | | E | 6.0 | 1.2 |
| | | 5 | 6.2 | 0 |
| 25% $SiO_2$/ 75% $CH_3Si\ O_{1.5}$ | 15.8 | F | 5.5 | 23.2 |
| | | G | 6.0 | 2.6 |
| | | 6 | 6.2 | 0.2 |

*Sample was very slightly crazed.

EXAMPLES 7-10 AND COMPARATIVE EXAMPLES H-K

Coating solutions were prepared by the cohydrolysis of tetraethylorthosilicate and methyltrialkoxysilanes.

In Examples H, I, 7 and 8, a mixture of 104 g of tetraethylorthosilicate and 136 g of methyltrimethoxyilane was hydrolyzed by adding a solution of 110 g of water and 5.0 ml of 0.1N hydrochloric acid solution. An exothermic reaction immediately ensued after which the mixture became homogeneous. The resulting solution was stirred at room temperature for an additional 4 hours.

In Examples J, K, 9 and 10, a mixture of tetraethylorthosilicate (104 g) and methyltriethoxysilane (178 g)

was cohydrolyzed by reaction with 110 g of water and 5.0 ml of 0.1N hydrochloric acid solution, and stirred at room temperature for 5 hours.

To 60 g portions of each of the above two base solutions was added 40 g of an iso-propyl alcohol/water mixture (25 g iso-propyl alcohol/15 g water), 0.5 ml of 10% acetic acid solution, and 0.4N sodium hydroxide 0.5 ml of 10% acetic acid solution, and 0.4N sodium hydroxide solution to adjust the pH to various levels. The resulting solutions were 16.4% solids, of which 31% was $SiO_2$ and 69% $CH_3SiO_{1.5}$. Samples of primed 7 mil polyethylene terephthalate film were dip coated and immediately cured for one minute at 100° C. Abrasion resistance of the samples was tested as before and the results of the testing are summarized in Table III below.

TABLE III

| Example | pH | Abrasion Resistance, % ΔH |
|---|---|---|
| H | 5.5 | 1.6 |
| I | 6.0 | 0.4 |
| 7 | 6.4 | 0.3 |
| 8 | 6.8 | 0 |
| J | 5.5 | 4.3 |
| K | 6.0 | 1.2 |
| 9 | 6.4 | 0.1 |
| 10 | 6.8 | 0.1 |

EXAMPLE 11

Two hundred parts of "LUDOX HS-30" colloidal silica were neutralized to pH 5.0 using glacial acetic acid. To the stirred, acidified colloidal silical dispersion was added 136 g of methyltrimethoxysilane. A slight exothermic reaction took place. The dispersion was then stirred at room temperature for 6 hours, after which it was diluted with a mixture of 200 g of iso-propyl alcohol and 100 g of water. The pH of this solution was 6.30–6.35. Additional acetic acid was added to a 100 g portion to provide a pH of 6.1. The solution contained approximately 20% solids, of which 47% was $SiO_2$ and 53% was $CH_3SiO_{3/2}$. After the solution had aged for 24 hours, samples of primed 7 mil polyethylene terephthalate film were dip coated, and then cured at 100° C. for 45 seconds. Adhesion of all coatings was excellent. Abrasion resistance was tested, and the % ΔH was found to be 0.

The above Example was repeated, using "Ludox SM" and "Ludox LS" colloidal silicas instead of the "Ludox HS-30" with the same low haze level in the final coated product.

EXAMPLE 12

Methyltrimethoxysilane (136 parts) was prehydroloyzed by adding a solution of 0.6 parts of glacial acetic acid in 100 parts of water. The solution was stirred for 25 minutes after the initial exothermic reaction (ΔT=30° C.). A 37.2 g portion of the resulting hydrolyzate was diluted with 31.4 g of iso-propyl alcohol. Acetic acid was added to achieve a pH for the final coating solution of 6.2. The acidified hydrolyzate solution was then added to 31.4 g of "Ludox SM" colloidal silica dispersion. The resulting coating contained approximately 20% solids, of which 47% was calculated to be $SiO_2$ and 53% $CH_3SiO_{1.5}$. Samples of primed 7 mil polyethylene terephthalate film were dip coated using solution which had aged for 25 hours. Abrasion resistance after curing at 100° C. for 45 seconds was measured as before, and % ΔH was found to be 0.

EXAMPLES 13–14

In Example 13, panels of poly (methylmethacrylate) sheeting which were prime-coated with a silane-modified acrylic resin (50% Acryloid K-120N, Rohm & Haas; 50% γ-glycidoxypropyltrimethoxysilane) were dip coated with a solution prepared as described in Example 11, except that LUDOX ® LS was used as the colloidal silica dispersion and the final pH of the solution was 6.3. After curing for two minutes at 100° C., the adhesion was 100% and Δ haze after abrasion with steel wool was 0.2%.

In Example 14, strips of polycarbonate (Lexan) which had been primed with a 1% solution of N-β (aminoethyl) - γ-aminopropyltrimethoxy silane (Union Carbide A-1120 Silane) were dip coated with the same solution and cured for two minutes at 100° C. These coatings exhibited excellent adhesion to the polycarbonate substrate, and did not abrade using the standard abrasion test.

I claim:
1. A polymeric film substrate coated to a thickness of about from 1 to 20 microns with a rapidly curing composition comprising
   (a) about from 5 to 50 weight percent solids, the solids comprising about from 10 to 70 weight percent silica and about from 90 to 30 weight percent of a partially polymerized organic silanol of the general formula $RSi(OH)_3$, wherein R is selected from methyl and up to about 40% of a radical selected from the group consisting of vinyl, phenyl, γ-glycidoxypropyl, and γ-methacryloxypropyl, and
   (b) about from 95 to 50 weight percent solvent, the solvent comprising about from 10 to 90 weight percent water and about from 90 to 10 weight percent lower aliphatic alcohol,
the coating composition having a pH of about from 6.2 to 6.5.

2. A coated article of claim 1 wherein the substrate consists essentially of polyethylene terephthalate.

3. A coated article of claim 1 wherein the substrate consists essentially of polymethylmethacrylate sheeting.

4. A coated article of claim 1 wherein the substrate consists essentially of polycarbonate sheeting.

* * * * *